United States Patent
Verhaegh et al.

(10) Patent No.: US 8,321,895 B2
(45) Date of Patent: Nov. 27, 2012

(54) SELECTING PROGRAM ITEMS DEPENDING ON A PERIOD OF TIME IN WHICH THE PROGRAM ITEMS ARE TO BE STORED

(75) Inventors: Wilhelmus Franciscus Johannes Verhaegh, Eindhoven (NL); Petrus Gerardus Meuleman, Eindhoven (NL)

(73) Assignee: Pace Micro Technology PLC (GB)

( * ) Notice: Subject to any disclaimer, the term of this patent is extended or adjusted under 35 U.S.C. 154(b) by 1120 days.

(21) Appl. No.: 10/549,232

(22) PCT Filed: Mar. 17, 2004

(86) PCT No.: PCT/IB2004/050265
§ 371 (c)(1),
(2), (4) Date: Sep. 12, 2005

(87) PCT Pub. No.: WO2004/084105
PCT Pub. Date: Sep. 30, 2004

(65) Prior Publication Data
US 2006/0173562 A1    Aug. 3, 2006

(30) Foreign Application Priority Data

Mar. 18, 2003    (EP) .................................... 03100677

(51) Int. Cl.
*H04N 5/445* (2006.01)

(52) U.S. Cl. .......................................... 725/58; 725/46

(58) Field of Classification Search .................... 725/57, 725/46, 58; 386/46
See application file for complete search history.

(56) References Cited

U.S. PATENT DOCUMENTS

| 5,534,911 | A | 7/1996 | Levitan |
| 6,781,972 | B1 * | 8/2004 | Anderlind et al. ............. 370/329 |
| 6,931,657 | B1 * | 8/2005 | Marsh .............................. 725/46 |
| 6,947,935 | B1 * | 9/2005 | Horvitz et al. ..................... 707/7 |
| 2002/0059584 | A1 | 5/2002 | Ferman et al. |
| 2002/0073424 | A1 | 6/2002 | Ward, III et al. |
| 2002/0081090 | A1 | 6/2002 | Agnihotri et al. |

FOREIGN PATENT DOCUMENTS

| EP | 1018840 A2 | 7/2000 |
| GB | 2346251 A | 8/2000 |
| GB | 2 354 089 A | 3/2001 |
| GB | 2354089 A | 3/2001 |
| WO | 0124524 A1 | 4/2001 |
| WO | 0152478 A2 | 7/2001 |
| WO | 0152478 A3 | 7/2001 |
| WO | 0203682 A2 | 1/2002 |

* cited by examiner

*Primary Examiner* — James R Sheleheda
(74) *Attorney, Agent, or Firm* — McKee, Voorhees & Sease, P.L.C.

(57) ABSTRACT

The invention relates to an apparatus for selecting at least one program item to be stored on the basis of user preferences. The apparatus comprises a receiver (110) for obtaining program schedule data related to at least one program item, and a timer (150) arranged to ascertain a period of time in which at least one program item is to be stored, a user preference module (130) arranged to obtain user preferences for at least one program item to be stored in the ascertained period of time, and a selection unit (140) arranged to select, using the program schedule data and the user preferences, at least one program item to be stored over a long period of time which is substantially longer than regular periods of nonusage of the apparatus. The invention takes into consideration that the user preferences for storing the program items may depend on the period of time in which the program items are to be selected.

6 Claims, 1 Drawing Sheet

SELECTING PROGRAM ITEMS DEPENDING ON A PERIOD OF TIME IN WHICH THE PROGRAM ITEMS ARE TO BE STORED

The invention relates to an apparatus for selecting at least one program item to be stored on the basis of user preferences, and a method thereof.

Document GB 2,354,089 discloses a system for automatically selecting programs. The system includes a television set and a video recorder unit arranged to receive a multi-channel TV signal. The system comprises a remote control unit used to identify the user of the system. The system maintains a user behavior base that monitors user's activities, holds user profiles providing the history of the user's watching habits and concludes which programs the user most likely wants to record among the available programs being broadcast on all the TV channels. Using the remote control unit, the user manually specifies a period of absence during which TV viewing will not be possible. The user behavior base is then prompted to predict from TV schedules a selection of programs to be recorded in the period of absence.

The selection performed by the known system of programs to be stored over long periods of time is of poor quality and comprises programs which are not interesting for the user after his absence.

It is an object of the present invention to obviate the drawback of the prior-art system, and to provide an apparatus and method for more intelligent and high-quality selection of program items to be stored.

The object of the invention is realized in that the apparatus for selecting at least one program item to be stored on the basis of user preferences, comprises:
  a receiver for obtaining program schedule data related to at least one program item,
  a timer arranged to ascertain a period of time in which at least one program item is to be stored,
  a user preference module arranged to obtain user preferences for at least one program item to be stored in the ascertained period of time, and
  a selection unit arranged to select, using the program schedule data and the user preferences, at least one program item to be stored over a long period of time which is substantially longer than regular periods of non-use of the apparatus.

The timer provides the period of time in which the program items are to be stored. The storage period of time may be determined by the user when he is about to leave and, therefore, will stop using the apparatus for some period of time. Alternatively, the timer may be arranged to calculate the absence period since the last time the apparatus was used by the user.

During long periods of user absence, e.g. when the user is on holiday, the user preferences for program items to be stored over a long period of time may be different from the user preferences for storing program items on a regular basis, e.g. daily or every two days. Indeed, the user who has returned home after his vacation may not be interested in viewing weather forecasts which are usually provided with news programs, or other program items containing information of temporary importance for the user. The user may not be interested to view all the TV news programs which are broadcast daily. Although these daily programs may be his favorite news programs, the user may simply not want to spend too much of his time to view the stored program items.

The apparatus may be arranged to enable the user to manually specify his preferences and select the specific program items to be stored throughout the period of absence, or at least to provide some general instructions concerning his preferences for the period of absence to the user preference module, such as "storing only program items which are highly rated and do not contain news-like information".

Alternatively, the selection unit may be arranged to select automatically the program items to be stored over the long period of time. This can be realized, for example, by maintaining two user profiles for selecting the program items to be stored, e.g. a regular user profile used for selecting the program items to be stored for the user who regularly uses the apparatus, for example, on a daily basis, and a vacation user profile used for selecting program items to be stored over a long period of time. The vacation user profile may differ from the regular profile in criteria for the selection of program items to be stored, such as a type (daily program), category (movie, serial, documentary, news etc), duration, rating of the program items and other parameters expressing changes of the user interests for storing the program items depending on the period of time in which the program items are to be stored. In another example, the selection unit may be arranged to select automatically a set of the program items to be stored using the regular user profile, e.g. as it is performed by the selection unit on the regular daily basis for the user, and then to refine said set, i.e. further elaborately select, from the selected set of items, a sub-set of the program items using different criteria such as storage space available in the apparatus or other devices connected to the apparatus, or other criteria as described above.

The selection unit may use relatively simple criteria for selecting the program items to be stored, for example, the percentage of the available storage space with respect to the total capacity of the storage.

More complex criteria may also be used. For instance, a TV program promoting the broadcast of social events (an advertisement about a concert of the user's favorite singer) which will be transmitted during the period of absence may not be selected for storage; this advertisement is not useful for the user. In turn, the broadcast TV program itself may be stored, rather than the advertisement about said program.

The object of the invention is also realized in that the method of selecting at least one program item to be stored on the basis of user preferences in an apparatus, comprises the steps of:
  obtaining program schedule data related to at least one program item,
  ascertaining a period of time in which at least one program item is to be stored,
  obtaining user preferences for at least one program item to be stored in the ascertained period of time, and
  selecting at least one program item to be stored over a long period of time which is substantially longer than regular periods of non-use of the apparatus, using the program schedule data and the user preferences.

The method describes the operation of the system of the present invention.

These and other aspects of the invention will be further elucidated and described with reference to the accompanying drawings, wherein.

Figure 1:
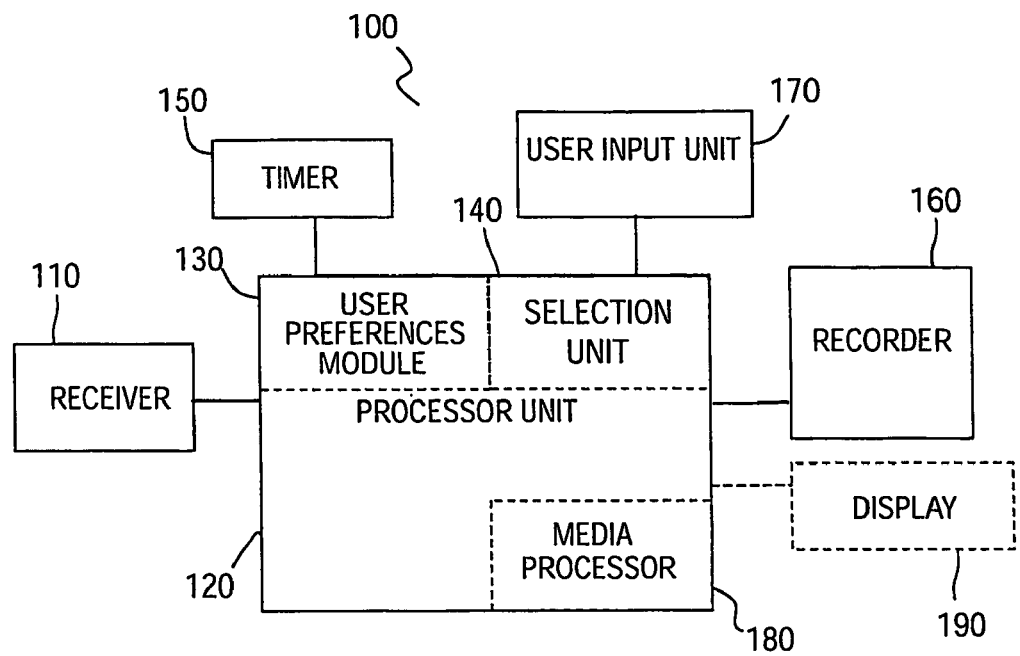
FIG. 1 shows a functional block diagram of an embodiment of the system suitable for implementing the present invention.

FIG. 1 shows an embodiment of the apparatus 100 suitable for implementing the present invention. The apparatus comprises a receiver 110 arranged to obtain program schedule data related to at least one program item. The program schedule information may comprise data about at least one program item, such as a channel on which the program is scheduled for broadcasting, a starting time and an end time of broadcasting, a title of the program item, a genre of the program item, a description of content of the program item, etc. The program items and the program schedule data may be delivered to the receiver 110 via an electrical conductor, a fiber-optic cable, satellite delivery, microwave delivery or mobile telephone network delivery, a data carrier or in any other manner. The receiver can be accordingly arranged to receive the information in any one of the mentioned ways. The program items may be broadcast television programs, media content items such as audio, video or text content, targeted advertising delivered by means of the Internet, etc. The program items and program schedule data may be communicated in any known format.

The receiver 110 may be coupled to a processor unit 120 controlling the operation of the apparatus in accordance with instructions which may be stored in a memory (not shown). The processor unit 120 may be suitably arranged to function as a user preference module 130 and/or a selection unit 140. The user preference module 130 and the selection unit 140 may be implemented in the form of the instructions stored in the memory and to be executed by the processor unit 120. A timer 150 and a recorder 160 for storing the program items may also be coupled to the processor unit 120. The apparatus 100 may be coupled to user input unit 170 for providing a user input to the system. Using the input means, the user may select program items for watching or storing. A keyboard, mouse, remote control unit or other user input device may be used as the user input unit. The apparatus 100 may comprise a display 190 for showing for the user the information related with the selection of the program items to be stored and/or for showing the program items to the user. The processor unit 120 may comprise a microprocessor (or microcontroller, or microcomputer), input/output circuitry, as well as other circuitry and components that are well known to those skilled in the art. The processor unit 120 has also a function of controlling the flow of information between different elements of the apparatus. However, other variations of implementing the apparatus according to the present invention are possible.

The timer 150 may be arranged to ascertain a period of time in which at least a program item is to be stored, for example, by determining the period of absence of a user during which the user will not use the apparatus or by ascertaining the period of time in which one of the users using the apparatus will be absent. The timer may be arranged to distinguish the period of absence for different users of the apparatus. To this end, the apparatus may also comprise user identification means for identifying different users using the apparatus, such as voice recognition means or finger print identification means. For instance, the timer 150 may be arranged to calculate the time period since the last usage of the apparatus by the user, e.g. since the last user command for selecting the TV channel to watch was communicated to the apparatus (so-called "zapping"). The apparatus may be arranged to store automatically the program items all the time when the user does not use the apparatus, and the user does not have to manually instruct the apparatus to store the program items. Of course, the apparatus may enable the user to manually specify the period in which the user would like to store the items.

By usage of the apparatus, user activities such as watching TV programs, zapping TV channels, manually instructing the recorder 160 to store the program item, etc. may be understood. However, the user may use the apparatus and still command the apparatus to store the program items in the period during which he used the apparatus, for example, because the user did not have an opportunity, e.g. enough time, to watch all of his favorite TV programs during that period.

The present invention is based on the insight that the user may prefer to have different program items to be stored for different periods of time. If the user would like the apparatus to store the program items on a daily basis when the user cannot watch them, e.g. when the user is away from the apparatus or is not at home, the user may prefer that all of his favorite program items are stored so that he can watch them later, e.g. after he has come back home at the end of the day. If the user would like the apparatus to store the program items over a long period with respect to the former "daily period", he may prefer that his favorite programs are stored selectively, i.e. not all of them are to be stored. The user preference module 130 may be arranged to obtain the user preferences taking into account the period of time in which the program items are to be stored.

For example, the user preference module may be arranged to maintain a "regular" user profile used by the selection unit 140 to select the program items to store in the regular period for storing the items, e.g. one day or two days, and a "vacation" user profile for storing the items in the period which is substantially longer than the regular period of time, e.g. a week or month. The regular user profile may be used by the selection unit by default. To use the vacation user profile for the selection of the program items to be stored, the timer may be arranged to calculate the period of time of continued non-usage of the apparatus by the user, e.g. how long the apparatus was not used by the user. Then, the timer may compare the calculated period with a threshold period of time stored in the timer, and if the calculated period of time is equal or exceeds said threshold period, the timer may be arranged to command, e.g. produce a signal or an instruction, the selection unit to use the vacation user profile for selecting the program items to be stored. More than one vacation user profile may be stored in the user preference module. The threshold period of time may be manually input by the user for the vacation user profile.

Alternatively to using the regular user profile and the vacation user profile, the selection unit 140 may be arranged to use the regular user profile provided by the user preference module to make a first selection of a set of the items in accordance with the "regular" user preferences for storing the items, and to perform a second selection of a sub-set from said set of the items, wherein said sub-set of the items is stored over the long period of time. For performing the second selection, the user preference module 130 may dynamically adjust the regular user profile to the period of time determined by the timer 150. For instance, the user profile may comprise information indicating categories of the user's favorite program like sports, movies, news, genres of the favorite programs, favorite TV channels, etc. The regular user profile may be modified, for example, by excluding some of the user's favorite programs from the profile because they may not be interesting for the user to watch after the period of time in which said program items will be stored.

Prior to the second selection, the program items that have been recorded may be partly or entirely removed. After switching to the vacation profile, the programs recorded using the regular profile that do not match the vacation profile are deleted.

The user preferences may change depending on the different periods of time for storing the program items because an importance or value of the information for the user may depend on the time when the information is provided to him, e.g. a transmission or broadcast date ("delivery date"), and/or a relevant date to which the content or context of the information relates. For example, the weather forecast program for the next day is outdated after the next day, the user is not interested to watch said transmitted program after the next day. On the other hand, the weather forecast program for next week is still interesting to the user during the whole week because the "relevant date" is the end of the next week, not the next day as in the previous example of the weather forecast program.

The selection of the program items to be stored depending on the time period may be done on the basis of the criteria, such as a category of the item, genre, frequency of the broadcast, duration of the program item, etc. (Table 1), by means of which the user preferences of the program items may be expressed. For instance, the user's favorite programs may be of certain categories and genres. The program items may be rated on the basis of said criteria in accordance with the user preferences.

TABLE 1

| | Title | | | | |
|---|---|---|---|---|---|
| | "BBC world news" | "Weekly review" | "Gone with the wind" | "Stalingrad: Rattenkrieg" | "D-reizen" |
| Category | News | news | movie | documentary | advertising |
| Genre | International | regional | classic/drama/romance | historical | travelling |
| Frequency | Hourly | weekly | once | once | weekly |
| Duration | 30 min | 55 min | 224 min | 45 min | 15 min |
| Relevant date | Today | last week | — | 1942 | April 2003 |
| Delivery date | 22 Feb. 2003 | 23 Feb. 2003 | 20 Feb. 2003 | 21 Feb. 2003 | 21 Feb. 2003 |

In accordance with the present invention, the program items may be given a further rating ("time-dependent" rating) which is determined on the basis of said criteria and/or "time-dependent" parameters related to changes of the user preferences for storing the program items depending on the period of time in which the items are to be stored, such as the relevant date and delivery date of the program item.

There are many ways to indicate the user preferences for storing the program items depending on the period of time in which the items are to be stored in the apparatus. For example, the criteria such as the category of the item, the genre, etc. can be made directly dependent on the duration of the period for storing the items, e.g. by specifying that the daily news programs must not be selected by the selection unit for storage in the apparatus if the storage period is longer than, for example, three days and the "time-dependent" rating of such news program items may be made very low or equal to zero. The weekly news programs may be rated with a high "time-dependent" rating when the storing period is longer than, for example, three days. If the period in which the program items are to be selected for storing is comparable with the one-month period, then monthly news program items may be given the high time-dependent rating, the weekly news program items may be given a lower rating and the daily news program items may be given a lower rating than the weekly news items. In turn, the movie program items, documentary program items, etc. may be given a high time-dependent rating because usually such items may be interesting for the users even if the users watch them a long time after the movie was filmed.

In another example, the "time-dependent" rating of the program items may be determined by the user preference module based on the relevant date and the delivery date, e.g. the program items like the announcement of the evening TV programs having the relevant date close to or the same as the delivery date (for instance, the difference may be in one day) may be given a low "time-dependent" rating. In that way, the "contemporaneous" program items may be rated with the low "time-dependent" rating because it may be valuable and interesting for the user only for a short period of time after the delivery time of this information.

In a further example, the "time-dependent" rating of the program items may be based on the criteria such as the category of the item, the genre, the program duration, etc. and the "time-dependent" parameters. For instance, the historic documentary program items may have the relevant date relating to some period in history and if the user preference module reveals that the user likes the history-related TV programs, e.g. the program items belonging to the category of documentary and having the historic genre are indicated as the user's favorite programs in the user's preferences, such program items may be given the high "time-related" rating and selected by the selection unit for storing. Rating of the program items in the news category may heavily depend on the relevant date and other parameters such as the topic and the content of the particular reportage and how stories develop over time, because news programs age quick. The news program reminding the user that the parliamentary election will occur at a certain date, which is the relevant date in this case, may be rated with the low time-dependent rating if the user will not watch said program item before that date of the election. In turn, the news program informing the user about the results of the parliamentary elections may be related with the high time-dependent rating even if the user is able to watch that stored item a long time after the delivery date of the program item.

The selection unit may also be arranged to select the program items to be stored for different periods of time based on the storage space available in the apparatus. The longer period of time in which the items are to be stored is ascertained by the timer, whereas the storage space capacity may remain the same in the apparatus, and, therefore, the amount of the program information that can be stored may determine the number of the program items which may be selected by the selection unit for storage in the apparatus. Thus, the selection unit may also take into account the available storage space, e.g. the storage space accessible in the recorder 160, when the program items are selected.

The selection unit may be arranged to estimate whether the period of time determined by the timer 150, in which the program items will be stored, allows selection of the program items for storing them completely or "only partly" in the available storage space. If the particular program item may not be stored entirely then the selection unit may command a media processor 180 coupled to the apparatus 100 arranged to process at least one program item and generate a summary of its content, to compress the program item to the available storage space by generating the summary of the item. The media compressor may be arranged to generate summaries of the program items which have a different size, duration and, thus, different levels of compression. For efficient operation of the selection unit and the recorder, the recorder may be arranged to assess the size of the most compressed summary of the program item if the summary was generated. To generate the summary of the content of the program item, the media processor may utilize a key frame generation technique in which the frames of the program items may be analyzed and frames which are the most descriptive of the content of the program are selected as the key frames; or partition the program item into different episodes of the program item, for example, a report in the news program, and select the episodes of the program item which may be most interesting to the user, or use other similar methods.

Alternatively to generating the summary of the program item, the media processor may be arranged to compress the program item to a lower quality level. For instance, MPEG-2 allows reducing the bit rate, at the expense of a lower picture quality. The processing can be done for audio and images.

Figure 2:
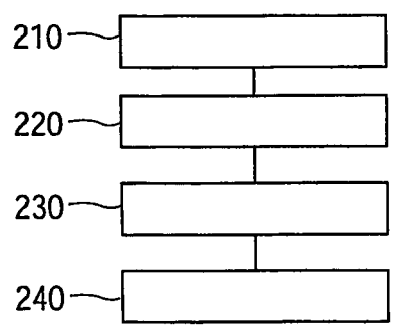
FIG. 2 shows an embodiment of the method according to the present invention.

FIG. 2 shows an example of the method in accordance with the present invention, describing the operation of the apparatus as disclosed above. The method comprises step 210 of obtaining the program schedule data related to at least one program item, step 220 of ascertaining a period of time in which at least one program item is to be selected by the selection unit. In step 230, the user preferences for at least one program item to be stored depending on the period of time calculated by the timer are obtained. A plurality of the vacation user profiles may be maintained by the user preference module. For example, one of the vacation user profiles may be used for selecting the program items depending on the period of time which has been calculated by the timer. Alternatively, the selection unit may utilize the regular user profile and different additional criteria such as the relevant date of the program item for selecting the program item to be stored taking into account the changes in the user preferences depending on the period ascertained by the timer in step 240. Different examples of the method may be derived from the description of the operation of the apparatus according to the present invention.

The various program products may implement the functions of the apparatus and method of the present invention and may be combined in several ways with the hardware or located in different other devices. Variations and modifications of the described embodiment are possible within the scope of the inventive concept Thus, for example, the use of the verb 'to comprise' and its conjugations does not exclude the presence of elements or steps other than those defined in a claim.

The invention can be implemented by means of hardware comprising several distinct elements, and by means of a suitably programmed computer. In the device claim enumerating several means, several of these means can be embodied by one and the same item of hardware. The apparatus according to the present invention described above may be incorporated in a personal video recorder, a personal computer or a television set.

The invention claimed is:

1. An apparatus for selecting at least one program item to be stored on the basis of user preferences, the apparatus comprising:
    a receiver for obtaining program schedule data related to at least one program item;
    a timer arranged to ascertain a period of time in which at least one program item is to be stored;
    a user preference module arranged to obtain user preferences for at least one program item to be stored in the ascertained period of time; and
    a selection unit arranged to select the at least one program item to be stored, using the program schedule data and the user preferences,
    wherein the selection of a program to be stored is made:
        with regard to a user input, or calculated, period of time of non usage of the apparatus, said period of time compared with a threshold period of time of non-usage of the apparatus by the user, and
        with reference to one of two stored user profiles, a regular user profile which is used to select at least one program item to be stored for a user when regularly using the apparatus, and a vacation user profile which is used to select at least one program item to be stored over a longer period of time of non-usage of the apparatus
    whereupon if the said period of time of non-usage is equal to or exceeds the threshold period of time the selection of a program is made based on the user vacation profile, and if the said period of time of non-usage is less than the threshold period of time the selection is made based on the regular user profile.

2. The apparatus of claim 1, wherein the timer is arranged to calculate a period of time of continued non-usage of the apparatus by the user, and compare the calculated period of time with a threshold period of time of non- usage of the apparatus by the user.

3. The apparatus of claim 1, wherein the user preference module is arranged to dynamically adjust the user preferences for the calculated period of time, and the selection unit is arranged to select automatically at least one program to be stored in the calculated period of time, using the adjusted user preferences.

4. The apparatus of claim 1, wherein the user preference module is arranged to determine a type of a particular program item and obtain the user preferences for storing at least one program item based on the type of said at least one program item.

5. The apparatus of claim 1, wherein the selection unit is arranged to select at least one program item to be stored on the basis of storage space in the apparatus.

6. The apparatus of claim 1, further comprising a media processor arranged to process at least one program item so as to generate and store a summary of its content.

* * * * *